United States Patent [19]
Komurasaki et al.

[11] Patent Number: 5,125,263
[45] Date of Patent: Jun. 30, 1992

[54] ACCELERATION DETECTOR

[75] Inventors: Satosi Komurasaki; Shoiti Katoh, both of Himeji, Japan

[73] Assignee: Mitsubishi Denki K.K., Tokyo, Japan

[21] Appl. No.: 491,012

[22] Filed: Mar. 9, 1990

[30] Foreign Application Priority Data

Mar. 10, 1989 [JP] Japan .................. 1-56174
Mar. 15, 1989 [JP] Japan .................. 1-60704

[51] Int. Cl.[5] ............................. G01P 15/09
[52] U.S. Cl. ...................... 73/35; 73/517 R
[58] Field of Search ............. 73/35, 517 R; 310/329

[56] References Cited

U.S. PATENT DOCUMENTS

| | | | |
|---|---|---|---|
| 4,254,354 | 3/1981 | Keem | 73/35 |
| 4,399,705 | 8/1983 | Weiger et al. | 73/35 |
| 4,574,616 | 3/1986 | Miura et al. | 73/35 |
| 4,637,246 | 1/1987 | Lombard et al. | 73/35 |
| 4,840,158 | 6/1989 | Komurasaki | |
| 4,966,031 | 10/1990 | Mochizuki | 73/35 |
| 4,967,114 | 10/1990 | Komurasaki et al. | 73/35 |

Primary Examiner—John E. Chapman
Attorney, Agent, or Firm—Sughrue, Mion, Zinn, Macpeak & Seas

[57] ABSTRACT

An acceleration detector comprising a housing and an acceleration transducer assembly including a piezoelectric element, an inertial weight and an output terminal. A thread-engaging fastener on the bushing, for securing the transducer assembly in the housing, and an electrically insulating washer is provided, and a resilient filler material is applied around the acceleration transducer assembly in the housing so that the movement of the inertial weight relative to the housing is allowed when an acceleration is applied. An electrically insulating, low-friction washer made of a plastic material selected from a group consisting of polyester, polyethylene terephtalate and polyphenylene sulfite is disposed between the thread-engaging fastener and the output terminal of the transducer assembly. An electrical connection including an external output terminal and the transducer output terminal is provided for defining an electric circuit having a series-connection of electrostatic capacitances of the insulating washer and the low-friction washer and an electrostatic capacitance of the piezoelectric element connected in parallel to the series-connected capacitances. The electrical connection may comprise a vibration-absorbing flexible conductor between the external output terminal and the output terminal of the acceleration transducer assembly.

14 Claims, 3 Drawing Sheets

ACCELERATION DETECTOR

BACKGROUND OF THE INVENTION

1. Field of the Invention

This invention relates to an acceleration detector and more particularly to an acceleration detector for detecting knocking in an internal combustion engine.

2. Description of the Related Art

FIGS. 1 and 2 illustrate one example of an acceleration detector to which the present invention can be applied. The acceleration detector comprises a housing 1 defining an annular cavity 2 therein and an annular acceleration transducer assembly 3 disposed within the cavity 2. The housing 1 comprises a tubular, electrically conductive metallic bushing 4 having a through hole 5 and a flange 6. The housing 1 also comprises a ring-shaped resinous outer case 7 bonded by a bonding agent 7a to the flange 6 of the bushing 4 so that the cavity 2 is defined therein.

The outer case 7 also has a connector 8 radially outwardly extending from the outer case 7 so that an external output terminal 9 can extend through the connector 8 for taking out an output signal from the acceleration transducer assembly 3 disposed within the cavity 2. The acceleration transducer assembly 3 further includes an annular piezoelectric element 11 placed on the terminal plate 10, a washer-shaped output terminal 12 including a lead 12a connected to the external output terminal 9, an electrically insulating washer 13 disposed on the output terminal 12, an annular inertial weight 14 placed on the insulating washer 13 and a threaded ring-shaped stop nut 15 thread-engaged with the thread 4a on the tubular bushing 4. An electrically insulating tape or tube 16 is placed on the tubular bushing 4 so that the acceleration transducer assembly 3 is insulated from the bushing 4 even when the output terminal 12 as well as the piezoelectric element 11 are eccentrically assembled.

In order to resiliently support and protect the acceleration transducer assembly 3 within the cavity 2 from undesirable environmental conditions, the remaining space of the cavity 2 of the housing 1 which is not occupied by the acceleration transducer assembly 3 is substantially filled with a resilient filler material 17 of a thermo-setting resin. The filler material 17 must be sufficiently resilient after it is cured to allow the movement of the inertial weight 14 relative to the housing 1 when an acceleration is applied to the inertial weight 14 so that the piezoelectric element 11 generates a voltage signal proportional to the pressure exerted on it by the relative movement of the inertial weight 14 against the piezoelectric element 11.

When in use, the acceleration detector is securely mounted on the internal combustion engine (not shown) by a suitable bolt (not shown) inserted into the central through hole 5 of the housing 1. The acceleration or the vibration of the internal combustion engine produces the movement of the inertial weight 14 relative to the housing 1, which causes the piezoelectric element 11 to be stressed by the inertial weight 14, whereby an electrical signal indicative of the movement of the inertial weight 14 relative to the engine is generated from the piezoelectric element 11. The electrical signal is provided from the output terminal 9 to be analyzed to determine as to whether or not a knocking signal which generates upon knocking of the internal combustion engine is involved. When it is determined that a knocking signal is contained in the electrical signal, the operating parameters for operating the engine can be adjusted to increase the output power or decrease the fuel consumption rate.

In the conventional acceleration detector as above described, since the washer-shaped output terminal 12 is inserted between the piezoelectric element 11 and the insulating washer 13, a parallel electrostatic capacitance circuit as illustrated in FIG. 3 is established between an electrostatic capacitance C11 of the piezoelectric element 11 and an electrostatic capacitance C13 of the insulating washer 13. As seen from FIG. 3, the overall capacitance C of the detector is the sum C11+C13 of the parallel-connected capacitances and is not determined by the capacitance C11 alone, but is relatively greatly affected by the capacitance C13 of the insulating washer 13. When the insulating washer 13 is made of polyester, for example, the capacitance C13 of the insulating washer 13 may be of the order of from 30 pF to 50 pF. Thus, since the capacitance C of the detector is not determined by the capacitance C11 of the piezoelectric element 11 alone, the overall capacitance C of the detector may vary greatly because it is determined not only by the capacitance C11 of the piezoelectric element 11 but also by the capacitance C13 of the insulating washer 13. By the way, the electrostatic capacitance C11 of the piezoelectric element 11 is 400 pF, for example.

Moreover, the piezoelectric element 11 generates an electric charge Q in response to the stress acting on it, and the capacitance C of the acceleration detector equals to the sum of the capacitances C of the acceleration detector equals to the sum of the capacitances C11 and C13. Therefore, the output voltage V from the acceleration detector can be expressed by $V=Q/(C11+C13)$. From this equation, it is understood that the fluctuation of the output voltage V of the acceleration detector is increased by the fluctuation of the capacitance C13 of the insulating washer 13.

Also, during assembly of the acceleration detector, the tightening rotation of the stop nut 15 on the bushing 4 of the housing 1 can cause the rotation of the acceleration transducer assembly 3 relative to the components and the housing 1 due to the friction between them. This may cause the misalignment of terminal lead 12a in the circumferential direction relative to the external output terminal 9. If such the misalignment is too large, the electrical connection between the output terminal 12 and the external output terminal 9 becomes impossible. In such case, the stop nut 15 must be loosened, the washer terminal must be turned into the correct position, and the stop nut 15 must be tightened again with a great care and hope so that no misalignment occurs this time. This results in an extended assembly time, leading to an increased cost of the acceleration detector.

Further, since the external output terminal 9 is connected through the connector 8 to an unillustrated connector extended from an external circuit (not shown), the detection characteristics of the acceleration transducer assembly 3 is disturbed as illustrated in FIG. 4 by the oscillations of the external output terminal 9, the connector terminal (not shown) of the external circuit (not shown) coupled to the external output terminal 9, the housing 1 including the connector 8 and the connector (not shown) of the external circuit (not shown) and the like.

SUMMARY OF THE INVENTION

Accordingly, one object of the present invention is to provide an acceleration detector free from the above discussed problems.

Another object of the present invention is to provide an acceleration detector in which the deviation of the output signal voltage generated by the acceleration detector is decreased.

Another object of the present invention is to provide an acceleration detector in which the deviation of the electrostatic capacitance of the detector is decreased.

Still another object of the present invention is to provide an acceleration detector that can be relatively easily assembled.

A further object of the present invention is to provide an acceleration detector in which a rotating torque acting on the acceleration transducer assembly due to the tightening rotation of the stop nut is prevented.

Still another object of the present invention is to provide an acceleration detector capable of exhibiting a smooth frequency characteristic curve.

Another object of the present invention is to provide an acceleration detector in which the undesirable vibration of the external output terminal is prevented from being transmitted to the acceleration transducer assembly.

With the above objects in view, the acceleration detector of the present invention comprises a housing defining a cavity and an acceleration transducer assembly including a piezoelectric element, an inertial weight, an output terminal and an insulating washer between the weight and the output terminal. A thread-engaging fastener on the bushing, for securing the transducer assembly in the housing, and an electrically insulating washer is provided, and a resilient filler material is applied around the acceleration transducer assembly in the housing so that the movement of the inertial weight relative to the housing is allowed when an acceleration is applied. An electrically insulating, low-friction washer made of a plastic material selected from a group consisting of polyester, polyethylene terephthalate and polyphenylene sulfite is disposed between the thread-engaging fastener and the output terminal of the transducer assembly. An electrical connection including an external output terminal and the output terminal is provided for defining an electric circuit having a series-connection of electrostatic capacitances of the insulating washer and the low-friction washer and an electrostatic capacitance of the piezoelectric element connected in parallel to the series-connected capacitances.

The electrical connection may comprise a vibration-absorbing flexible conductor between the external output terminal and the output terminal of the acceleration transducer assembly.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
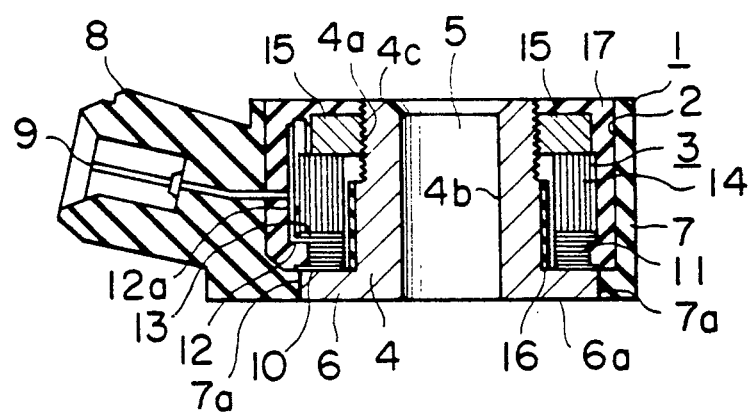
FIG. 1 is a sectional side view showing one example of a conventional acceleration detector.
Figure 2:
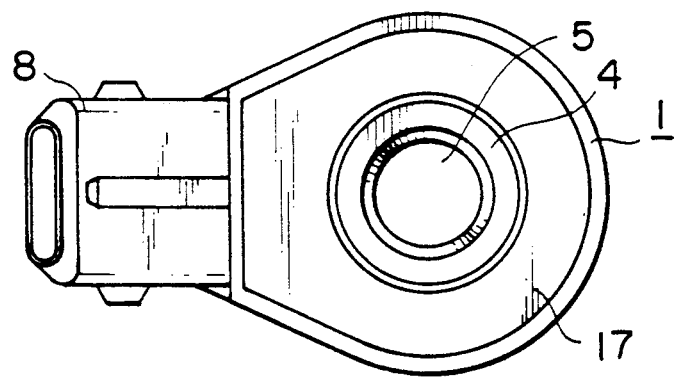
FIG. 2 is a plan view of the acceleration detector shown in FIG. 1.
Figure 5:
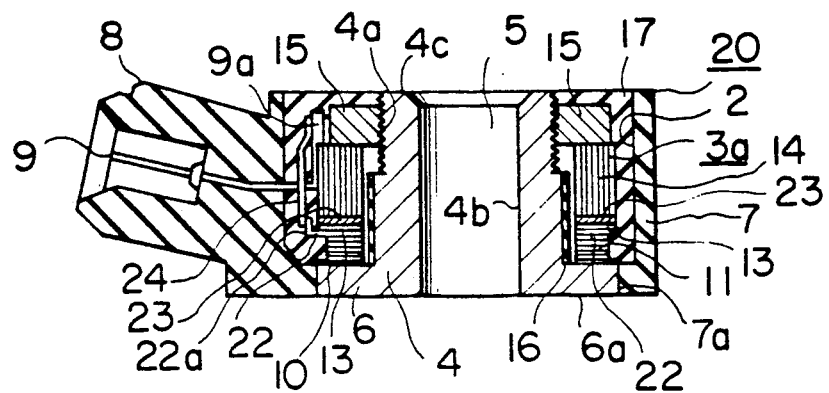
FIG. 5 is a sectional side view showing one embodiment of the acceleration detector of the present invention.
Figure 3:
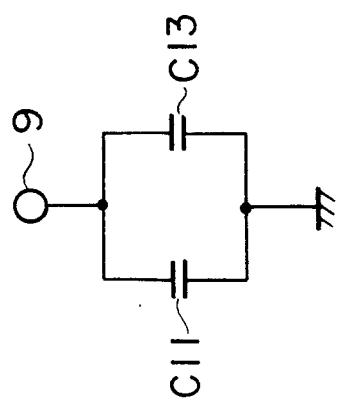
FIG. 3 is an electrical circuit diagram illustrating the electrical relationship of the capacitances in the acceleration detector of the conventional design.
Figure 4:
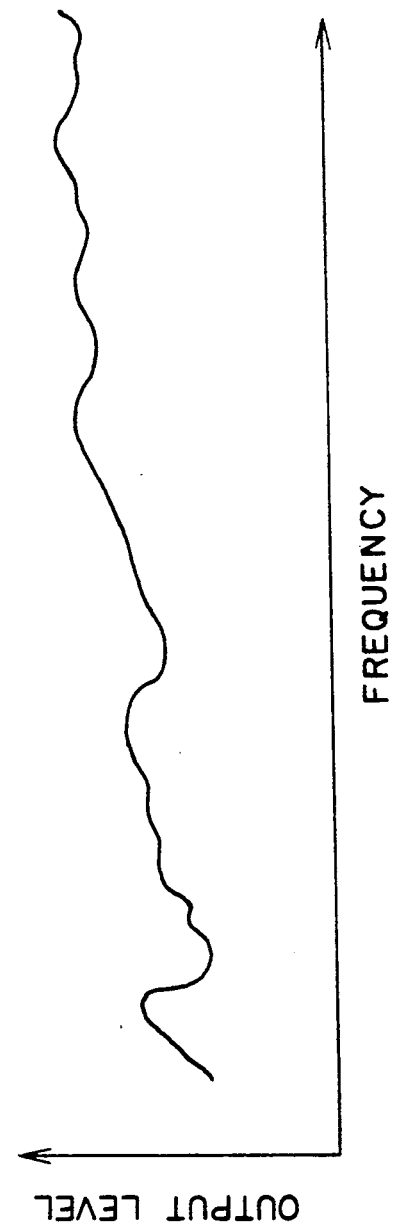
FIG. 4 is a graph showing the output characteristics of the acceleration detector of the conventional design.

The acceleration detector 20 of the present invention has a basic structure similar to that described and illustrated in conjunction with FIG. 1. More particularly, the acceleration detector 20 comprises a housing 1 defining an annular cavity 2 therein and an annular acceleration transducer assembly 3a disposed within the cavity 2. The housing 1 comprises a tubular, electrically conductive metallic bushing 4 having a through hole 5 and a flange 6. The housing 1 also comprises a ring-shaped resenous outer case 7 bonded by a bonding agent 7a to the flange 6 of the bushing 4 so that the cavity 2 is defined therein.

The outer case 7 also has a connector 8 radially outwardly extending from the outer case 7 so that an external output terminal 9 having an upwardly extended inner end 9a can extend through the connector 8 for taking out an output signal from the acceleration transducer assembly 3a disposed within the cavity 2. The acceleration transducer assembly 3a includes a terminal plate 10 disposed on the flange 6 of the bushing 4, an annular piezoelectric element 11 placed on the terminal plate 10 and a washer-shaped output terminal 22. The output terminal 22 includes at its outer periphery an upwardly extending connecting tab 22a, which is connected to an upper end of the inner end 9a of the external output terminal 9 through a flexible conductor 24 which is sufficiently flexible to substantially absorb vibration from the external output terminal 9 so that substantially no vibration from the connector portion 8 is transmitted to the acceleration transducer assembly 3a.

The acceleration transducer assembly 3a also comprises an electrically insulating washer 13 disposed on the output terminal 22, an electrically insulating, low-friction washer 23 disposed on the insulating washer 13, an annular inertial weight 14 placed on the low-friction washer 23 and a threaded ring-shaped stop nut 15 thread-engaged with the thread 4a on the tubular bushing 4. An electrically insulating tape or tube 16 is placed on the tubular bushing 4 so that the acceleration transducer assembly 3a is insulated from the bushing 4 even when the output terminal 12 as well as the piezoelectric element 11 are eccentrically assembled. The electrically insulating, low-friction washer 23 may be disposed between the thread-engaging fastener 15 and the counter weight 14 or between the insulating washer 13 and the output terminal 22. The low-friction washer 23 is made of a suitable electrically insulating material such as a plastic material selected from a group consiting of polyester, polyethylene terephthalate and polyphenylene sulfite.

In order to resiliently support and protect the acceleration transducer assembly 3a within the cavity 2 from undesirable environmental conditions, the remaining space of the cavity 2 of the housing 1 which is not occupied by the acceleration transducer assembly 3a is substantially filled with a resilient filler material 17 of a thermo-setting resin. The filler material 17 must be sufficiently resilient after it is cured to allow the movement of the inertial weight 14 relative to the housing 1 when an acceleration is applied to the inertial weight 14 so that the piezoelectric element 11 generates a voltage signal proportional to the pressure exerted on it by the relative movement of the inertial weight 14 against the piezoelectric element 11.

Figure 6:
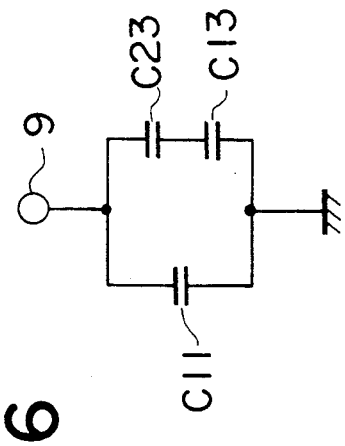
FIG. 6 is a circuit diagram illustrating the electrical relationship of the capacitances in one embodiment of the acceleration detector of the present invention.

According to the acceleration detector 20 of the present invention, the low-friction insulating washer 23 is inserted between the output terminal 22 and the stop nut 15 and preferably between the insulating washer 13 and the counter weight 14. Therefore, as diagramatically illustrated in FIG. 6, various electrostatic capacitances of the detector components are connected by an electrical path including the external output terminal 9 in such a manner that a series-connection of an electrostatic capacitance C13 of the insulating washer 13 and an electrostatic capacitance C23 of the low-friction washer 23 is connected in parallel to an electrostatic capacitance C11 of the piezoelectric element 11. Therefore, the overall capacitance Cov of the series-connected capacitances C13 and C23, which is smaller than the capacitance C13, can be expressed by the following equation:

$$Cov = \frac{1}{(1/C13) + (1/C23)} < C13$$

That is, since the overall capacitance Cov is small relative to the capacitance C11 of the piezoelectric element 11, the overall capacitance C20 ($=$C11$+$Cov) of the acceleration detector 20 is small, so that, even when the percentage of the deviation of the capacitance Cov is at the same level as that of the conventional detector, the deviation of the detector capacitance C20 is decreased by an amount corresponding to the decreased amount, thus the detector capacitance C20 of the acceleration detector 20 becomes close to the capacitance C11.

When the materials for the insulating washer 13 and the low-friction washer 23 are selected so that their capacitances C13 and C23 have temperature characteristics of the same general variation profile, the detector capacitance of the conventional detector has similar-slope but steeper temperature characteristic profile. However, according to the present invention, the insulating washer 13 and the low-friction washer 23 are selected to have capacitances C13 and C23 having temperature characteristic profile of different slope directions, thereby enabling the correction of detector capacitance C20 to depend upon the temperature characteristics of the capacitance C11 of the piezoelectric element 11. For example, one of the insulating washer 13 and the low-friction washer 23 may be made of polyester and the other of them may be made of polyphenylene sulphite, thereby to enable the above-mentioned correction.

Also, since the low-friction washer 23 is inserted between the output terminal 22 and the stop nut 15, and preferably between the insulating washer 13 and the counter weight 14, the rotation of the acceleration transducer assembly 3a relative to the housing 1 as well as the rotation of the assembly components relative to each other during the tightening rotation of the stop nut 15 is prevented.

Figure 7:
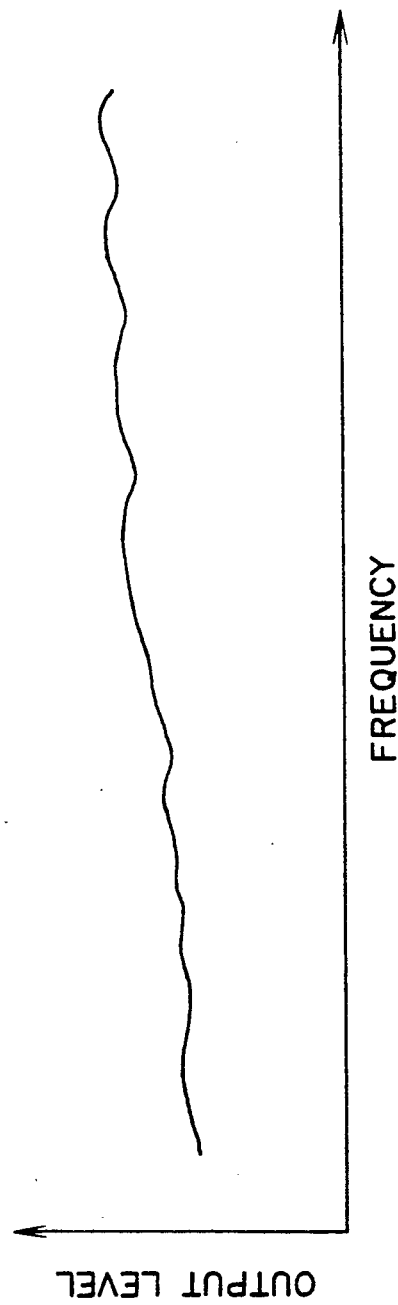
FIG. 7 is a graph showing the output characteristics of the acceleration detector of the present invention.

Further, the external output terminal 9 and the output terminal 22 of the transducer assembly 3a are not directly connected but are connected through the flexible conductor 24 having a sufficient flexibility to substantially absorb vibration from the external components entering into the transducer assembly 3a through the connector portion 8. Therefore, an undesirable noise vibration is prevented from being transmitted to the transducer 3a, whereby the frequency characteristics of the detector output signal is significantly improved and the detector output from the acceleration detector 20 against varying frequency is smooth and accurate as shown in FIG. 7.

What is claimed is:

1. An acceleration detector comprising:
   a housing defining a cavity therein and including an electrically conductive metallic bushing and an electrically insulating resinous outer case;
   an acceleration transducer assembly disposed on said bushing in said cavity and including a piezoelectric element, an output terminal, an inertial weight and an electrically insulating washer;
   securing means, including a thread-engaging fastener thread-engaging to said housing, for securing said acceleration transducer assembly to said housing, said thread-engaging fastener having a contact surface at which said thread-engaging fastener contacts and supports said acceleration transducer assembly;
   a resilient filler material applied around said acceleration transducer assembly for resiliently sealing said acceleration transducer assembly, said resilient filler material being sufficiently resilient to allow the movement of said inertial weight relative to said housing when an acceleration is applied to said inertial weight;
   an electrically insulating, low-friction washer disposed between said thread-engaging fastener and said output terminal of said acceleration transducer assembly; and
   electrical connection means, including an external output terminal attached to said housing for external connection and said output terminal of said acceleration transducer assembly, for defining an electric circuit having a series-connection of electrostatic capacitances of said insulating washer and said low-friction washer and an electrostatic capacitance of said piezoelectric element connected in parallel to said series connected capacitances.

2. An acceleration detector as claimed in claim 1, wherein said low-friction washer is made of a plastic material selected from a group consisting of polyester, polyethylene terephthalate and polyphenylene sulfite.

3. An acceleration detector as claimed in claim 1, wherein one of said insulating washer and said low-friction washer is made of polyester and the other of said insulating washer and said low-friction washer is made of polyphenylene sulfite.

4. An acceleration detector as claimed in claim 1, wherein said low-friction washer is inserted between said insulating washer and said inertial weight.

5. An acceleration detector as claimed in claim 1, wherein said low-friction washer is inserted between said thread-engaging fastener and said inertial weight.

6. An acceleration detector as claimed in claim 1, wherein said low-friction washer is inserted between said insulating washer and said output terminal.

7. An acceleration detector as claimed in claim 1, wherein said electrical connection means comprises a flexible conductor between said external output terminal and said output terminal of said acceleration transducer assembly, said flexible conductor being sufficiently flexible to substantially absorb vibration from said external output terminal.

8. An acceleration detector as claimed in claim 7, wherein said external output terminal has an upwardly extending end and said output terminal has an extending portion, and
   wherein said flexible conductor has first and second ends, the first end is connected to the upwardly extending end of said external output terminal and the second end is connected the extending portion of said output terminal.

9. An acceleration detector comprising:
   housing means for holding said acceleration detector;
   an acceleration transducer assembly including a piezoelectric element, an output terminal, an inertial weight and an electrically insulating washer;
   securing means, including a threaded fastener, for securing said acceleration transducer assembly to said housing;
   an electrically insulating, low-friction washer, disposed between said threaded fastener and said output terminal of said acceleration transducer assembly, for substantially preventing rotation of said acceleration transducer means relative to said housing and rotation of the components of said acceleration transducer assembly relative to one another during the securing of said acceleration transducer means to said housing by said securing means; and
   external output terminal operatively connected to said output terminal of said acceleration transducer means.

10. An acceleration detector as claimed in claim 9, wherein said acceleration detector further comprises connection means for electrically connecting said external output terminal and said output terminal of said acceleration transducer means and for absorbing vibration from said external output terminal.

11. An acceleration detector as claimed in claim 10, wherein said external output terminal has an upwardly extending end and said output terminal has an extending portion, and
   wherein said connection means includes a flexible conductor having first and second ends, the first end is connected to the upwardly extending end of said external output terminal and the second end is connected the extending portion of said output terminal.

12. An acceleration detector as claimed in claim 11, wherein said acceleration detector has a capacitance based on capacitance values of said electrically insulating washer, said piezoelectric element and said electrically insulating, low-friction washer, and
   wherein said flexible conductor, said electrically insulating washer and said electrically insulating, low-friction washer are arranged to place the capacitance values of said electrically insulating washer and said electrically insulating, low-friction washer in parallel with the capacitance value of the piezoelectric element.

13. An acceleration detector as claimed in claim 9, wherein said acceleration detector has a capacitance based on capacitance values of said electrically insulating washer, said piezoelectric element and said electrically insulating, low-friction washer, and
   wherein the capacitance values of said electrically insulating washer and said electrically insulating, low-friction washer are connected in parallel to the capacitance value of the piezoelectric element.

14. An acceleration detector as claimed in claim 13, wherein the capacitance of said acceleration detector is substantially equal to the capacitance of the piezoelectric element.

* * * * *